United States Patent [19]

Reeg

[11] Patent Number: 5,401,522
[45] Date of Patent: * Mar. 28, 1995

[54] PROCESS FOR PREPARING DOUGH AND IMPROVED PRODUCT

[75] Inventor: Peter Reeg, Hameln, Germany

[73] Assignee: A. Stephan U. Soehne Gmbh & Co., Hameln, Germany

[ * ] Notice: The portion of the term of this patent subsequent to Mar. 7, 2012 has been disclaimed.

[21] Appl. No.: 950,265

[22] Filed: Sep. 25, 1992

Related U.S. Application Data

[63] Continuation-in-part of Ser. No. 810,419, Dec. 20, 1991.

[51] Int. Cl.$^6$ .................... A23L 1/10
[52] U.S. Cl. .................... 426/549; 426/439; 426/560
[58] Field of Search .................... 426/549, 560, 439

[56] References Cited

U.S. PATENT DOCUMENTS

| | | |
|---|---|---|
| Re. 26,263 | 9/1967 | Madrazo et al. . |
| 115,947 | 6/1871 | Fitts . |
| 173,211 | 2/1876 | Chichester . |
| 184,837 | 1/1876 | Chichester . |
| D. 294,448 | 3/1988 | Otto . |
| D. 312,188 | 11/1990 | Otto . |
| 1,035,842 | 8/1912 | Anderson . |
| 1,920,107 | 1/1927 | Richardson . |
| 2,916,378 | 12/1959 | Kunce et al. .................... 99/80 |
| 3,046,139 | 7/1962 | Gould .................... 99/93 |
| 3,369,908 | 2/1958 | Gonzalez et al. . |
| 3,404,986 | 10/1968 | Wimmer et al. .................... 99/93 |
| 3,687,685 | 8/1972 | Rubio .................... 99/80 R |
| 3,690,893 | 9/1972 | Rubio .................... 99/80 R |
| 3,694,224 | 9/1972 | Rubio .................... 99/80 R |
| 3,743,192 | 7/1973 | Otto et al. . |
| 4,081,570 | 3/1978 | Otto et al. . |
| 4,189,504 | 2/1980 | Jimenez . |
| 4,205,094 | 5/1980 | Baird . |
| 4,234,614 | 11/1980 | Hart . |
| 4,299,857 | 11/1981 | Velasco . |
| 4,335,649 | 6/1982 | Velasco . |
| 4,614,665 | 9/1986 | Furuya . |
| 4,623,548 | 11/1986 | Willard . |
| 4,623,550 | 11/1986 | Willard . |
| 4,640,843 | 2/1987 | Matuszak et al. .................... 426/560 |
| 4,650,337 | 3/1987 | Otto . |
| 4,737,371 | 4/1988 | Bookwalter .................... 426/462 |
| 4,756,920 | 7/1988 | Willard . |
| 4,769,253 | 9/1988 | Willard . |
| 4,770,891 | 9/1988 | Willard . |
| 4,861,609 | 8/1989 | Willard et al. . |
| 4,863,278 | 9/1989 | Otto . |
| 4,876,101 | 10/1989 | Willard . |
| 4,878,627 | 11/1989 | Otto . |
| 4,955,724 | 9/1990 | Otto . |

FOREIGN PATENT DOCUMENTS 1041932 9/1966 United Kingdom .

OTHER PUBLICATIONS

Derwent Publications Ltd., London, GB; Class D11, AN 90-045206 & AU-D-3 676 289, Jan. 4, 1990.

*Primary Examiner*—Donald E. Czaja
*Assistant Examiner*—Mary S. Mims
*Attorney, Agent, or Firm*—Foley & Lardner

[57] ABSTRACT

A process for preparing dough, in particular a corn dough, for the preparation of snack foods such as, for example, corn chips, tortillas, taco shells or the like, in which ground cereals are mixed with water to form a mixture, the mixture is heated and subsequently cooled. The mixture is heated only to a temperature slightly above the gelatinization temperature of the cereal starch, and the mixture is cooled as early as after only partial gelatinization of the cereal starch.

32 Claims, No Drawings

PROCESS FOR PREPARING DOUGH AND IMPROVED PRODUCT

BACKGROUND OF THE INVENTION

This application is a continuation-in-part of application Ser. No. 07/810,419, filed Dec. 20, 1991, pending.

FIELD OF THE INVENTION

The present invention relates to a process for preparing dough, in particular, a corn dough, for use in the preparation of snack foods such as, for example, corn chips, tortillas, taco shells or the like, in which ground cereals are mixed with water, the mixture is heated and subsequently cooled. The invention also relates to an improved corn dough product produced by the process.

DESCRIPTION OF THE RELATED ART

In known processes for the preparation of a corn dough, a corn mixture is heated to more than 70° C., preferably up to 90° C. This heating step is followed by a period of holding time to allow the mixture to gelatinize and swell, after which the mixture is rapidly cooled to approximately 66° C. to terminate the cooking operation. This is followed by further, slightly slower cooling to temperatures of from 35° C. to 43° C. During the entire cooling operation, moisture is drawn off.

It is impossible for the CORN MASA (raw corn dough) prepared by this known process to be further processed on conventional rollers for punching out the products to give, for example, corn chips, tortillas or the like.

The only possibility is to use special rolling out equipment used in the cookie-manufacturing industry with which a sticky product can be handled.

SUMMARY OF THE INVENTION

One object of the present invention is to improve upon the conventional process described above.

Another object of the invention is to provide an improved corn dough product.

According to the present invention, these objects are achieved by heating the mixture only to a temperature slightly above the gelatinization temperature of the cereal starch and initiating the cooling of the mixture as early as after only partial gelatinization of the cereal starch.

The present invention is based on the recognition that the disadvantages of the prior art processes essentially reside in the fact that a very high proportion of the cereal starch has gelatinized as a consequence of the starting mixture being heated for a comparatively long time at a high temperature far above the actual gelatinization temperature.

According to the invention, the maximum temperature at which the starting mixture is heated during the preparation of corn dough is limited to 70° C.; preferably heating is only carried out to 58° C. Gelatinization of corn starch sets in at approximately 50° C. Experiments have shown that at a temperature of approximately 58° C., an adequate proportion of corn starch has gelatinized, whereas exceeding a temperature of 70° C. results in too high a proportion of the starch becoming gelatinized and thus becoming a sticky corn mixture.

It is possible, in principle, to process various types of cereals and mixtures thereof according to the present novel process. Corn, however, is preferably used, and, in the most preferred embodiment, it is ground to a degree of fineness which is produced in conventional stone mills. Accordingly, the ground corn is to be used in a mixture of fine flour and particles of up to 2 mm in diameter. The correct distribution is important for the requisite water absorption and for the displacement of the water by oil during the deep-frying operation at a later stage. Use is preferably made of a corn blend which contains a lower proportion of the corn pericarp layer but a higher starch content. In a preferred process, the entire recipe amount of water is added to the starting mixture. In principle, however, it is also possible to add only part of the recipe amount of water to the starting mixture and to add the remaining amount of recipe water as late as in the cooling phase.

For the chemical reaction, it is expedient to add lime to the starting mixture, preferably in the form of calcium hydroxide and in an amount such that the prepared corn mixture has a pH of approximately 9.0 to 11.0. The flavor of the finished product is also affected favorably by the added lime.

In addition to the lime, or as a substitute therefor, a "food grade acidic compound" may be added to the mixture. In one embodiment, the acidic compound is added after the initial mixture of lime, corn and water has attained a mixture temperature of at least about 50° C. Alternatively, the acid may be added to the initial mixture, and lime subsequently added after the initial mixture of acid, corn and water has attained a mixture temperature of at least about 50° C.

The term "food grade acidic compound" includes any food grade acid as well as or any compound which will serve to hydrolyze the hydroxyl group of the starch in the same manner as an acid. The acidic compound preferably is selected from the group consisting of phosphoric acid, fumaric acid, citric acid, malic acid, ascorbic acid, epichlorohydrin, phosphoroxychloride, acrolein, sodium trimetaphosphate, succinic acid anhydride, adipic anhydride, ethyl acetate or other acetic acid esters, and hydroxypropyl esters, such as amylopectin and/or derivatives thereof, and the like. It is preferable to add the acidic compound as a 75% solution to the starting mixture in an amount of about 0.4 wt % based on the weight of the mixture.

The addition of the acidic compound has a particularly advantageous effect on the structure and the color of the dough prepared. While not intending to be bound by any theory, it is believed that this effect is based on a cross-linking or substitution of the hydroxyl groups present in the corn starch. Upon addition of the acidic compound, the pH of the mixture is lowered even further to a pH within the range of from about 3 to about 11 Preferably, the pH of the mixture is within the range of from about 6 to about 8.

Mixing of the starting ingredients to give a homogeneous mixture (mixing phase) is carried out at room temperature and preferably by means of mixing equipment rotating at high speed over a period of less than about 1 minute. This mixing phase can be followed by a holding time (first holding time) to ensure that the corn absorbs the water and reacts with the lime. However, experiments have shown that this holding time can also be dispensed with if necessary.

According to the invention it is advantageous for the heating of the mixture to be effected predominantly by frictional heat introduced into the mixture via the mixing equipment. For this purpose, use is preferably made of mixing equipment rotating at high speeds with broad surfaces. This equipment, by means of friction created in the mixture, brings the homogeneous mixture to an end temperature of preferably about 58° C. Temperatures as high as 65° C. can be attained when the food grade acidic compound is used. In contrast to heating the mixture by direct introduction of steam into it, which is also possible according to the invention, heating the mixture by frictional heat alone has the advantage that the moisture content of the mixture remains unchanged and constant, and uniform heating is achieved.

In principle, combinations of these and other heating methods can also be employed such as, for example, the use of a heated bowl with double walls, microwave heating, or the like. An essential feature of all heating methods, however, is that gelatinization of the starch, which sets in at approximately 50° C., is terminated in time for a corn mixture of a particular dough texture having various desired degrees of gelatinization to be produced depending on the finished product that is desired.

With certain methods, it was found to be advantageous to provide a holding time of approximately 1 minute after reaching the end temperature of, for example, 58° C., during which holding time the heated mixture remains stationary and additional heating is switched off. In this manner, an even temperature throughout the mixture with uniform gelatinization can be achieved.

Cooling is carried out to a temperature below the temperature at which gelatinization of the starch sets in, i.e., to a temperature <50° C., preferably to about 43° C. Cooling may be carried out to a temperature as low as about 35° C. when the food grade acidic compound is used. According to the invention, this cooling is to be effected rapidly, preferably over a period of up to about 3.5 minutes. The cooling interrupts the gelling. In this context, cooling can be effected, for example, by applying a vacuum using a vacuum-condenser system.

During the cooling phase, the impact of the rotating mixing equipment on the mixture must not be too strong. This is to avoid producing a sticky corn mixture. It is therefore expedient to conduct only intermittent mixing with the mixing equipment rotating, for example, only for approximately 3 seconds at 30 second-intervals. However, it is also possible to allow the mixing equipment to rotate continuously at a low speed.

If, at the start of the process, only part of the recipe amount of water is added, the remaining amount of water can be added during the cooling phase to produce a cooling effect. In order to incorporate the remaining amount of water added into the mixture, it is necessary to mix the mixture and the added volume of water. For this purpose, the mixing equipment can rotate for periods up to approximately half a minute at high speed.

A major advantage of the process according to the present invention resides in the fact that the entire process, including automatic discharge of the corn mixture, can be carried out fully automatically in a mixing bowl. Uniform texture and consistent flavor of the corn mixture is thereby guaranteed.

At the end of the process of the present invention, the resulting corn mixture is a cold, dense, slightly cohesive but not sticky dough which can be easily processed with a machine, has a moisture content of approximately 46% to 52% and a pH of approximately 9 to 11. In the case where an acidic compound is employed, the pH is somewhat lower, preferably within the range of from about 6 to 8.

Advantageously, the process according to the present invention can be carried out using a UMM/SK 44 E Pilot-type machine or with a larger Combicut machine, both by Messrs. Stephan. These machines have broad mixing blades which, in their operational phase, can attain speeds of rotation of at least 1,000 to 3,600 rpm. Furthermore, these machines are equipped with a circulator which scrapes the walls of the bowl, usually at about 26 rpm.

With a machine of this type by Messrs. Stephan, the corn masa can be prepared, for example, by the following process.

EXAMPLES

EXAMPLE 1

Constituents of the recipe are 9 kg of specially ground and blended corn, 7.2 kg of water and 30 g of calcium hydroxide. These constituents are mixed at a room temperature of approximately 23° C. for 60 seconds with mixing equipment rotating at 1,750 rpm (and, if appropriate, additionally with a circulator rotating at the same time at 26 rpm) to produce a homogeneous mixture. A holding time of 5 to 10 minutes follows in which no mixing occurs. Thereafter, the mixture is heated to 58° C. by frictional heat alone which is introduced into the mixture over a period of approximately 8 minutes by the mixing equipment rotating at 1,750 rpm. Alternatively, heating can be effected by direct introduction of dry steam into the mixture to be heated at a pressure of 2 bar. After the mixture has reached the desired end temperature of 58° C., a second holding time of approximately 1 minute follows during which time neither mixing nor further heating of the mixture occurs. Subsequently, rapid cooling of the mixture from 58° C. down to 43° C. follows over a period of approximately 3.5 minutes by means of vacuum-condenser cooling. During this cooling phase the mixing equipment only rotates intermittently, for example, each time for 3 seconds at 30 second-intervals and at a rate of 1,750 rpm. With appropriate setting of the machine, however, it is also possible for the mixing equipment to rotate continuously at a crawl speed of approximately 55 rpm. If, however, during this cooling phase a remaining amount of water is added, an additional mixing stage is necessary, and the equipment is rotated for approximately 30 seconds at a rate of 1,750 rpm.

The process according to the present invention can be carried out in particular with machines from Messrs. A. Stephan u. Söhne GmbH & Co., and especially with Combicut machines with a vacuum facility and a condenser; the drum capacity of these machines can be from 200 l to 1,500 l.

EXAMPLE 2

The procedures of Example 1 were followed with the following modifications. Nine kg of specially ground and blended corn, 7.2 kg of water and 30 g of calcium hydroxide are used in the initial mixture. These constituents are mixed as in Example 1 with mixing equipment rotating at 1,750 rpm (and, if appropriate, additionally with a circulator rotating at the same time at 26 rpm) to produce a homogeneous mixture. Following the attainment of a mixing temperature of 52° C., the mixing equipment is stopped, and about 40 g of fumaric acid is added to the mixture in powdered form.

After reactivation of the mixing equipment, the mixture is heated by friction to an end temperature of 65° C. Subsequently, rapid cooling of the mixture from 65° C. down to 37° C. follows by vacuum-condenser cooling.

EXAMPLE 3

The procedures of Example 1 were followed with the following modifications. Approximately 60 g of a 75% phosphoric acid solution of food grade mixed with 7 kg water. Then, about 9 kg of corn ground to a particle size of less than about 2 mm in diameter are added. This initial mixture is heated by a mixing tool operating at 1750 rpm until a mixing temperature of 57° C. is obtained. Then, 50 g of calcium hydroxide are added and the mixing continued at 1750 rpm until the mixture reaches the end temperature of 61° C. Subsequently, the mixture is rapidly cooled from 61° C. down to 37° C. by vacuum-condenser cooling.

The resulting masa is formed into chips, toasted in an oven and fried in the conventional manner. The resulting product exhibits a lightness of color and a tender texture that are considered superior to products made without employing the present invention. An improvement is achieved even with respect to products made according to Example 1.

The progression of the procedure initiated by the process according to the invention can be controlled very precisely by simple means, since the progressing gelatinization and/or swelling process is directly proportional to the output of the main motor. Control can thus be effected in a simple manner by means of corresponding output measurement instruments which are commercially available.

The invention has been explained in detail with reference to preferred embodiments. Those skilled in the art recognize that variations and modifications can be made to the invention without departing from the spirit and scope thereof.

What is claimed is:

1. A process for preparing dough, used in the preparation of snack foods, comprising:
    mixing ground cereals with water to form a mixture;
    adding a food grade acidic compound to the mixture;
    heating the mixture to a temperature of between about 50° C. and 70° C.; and
    subsequently cooling the mixture in a cooling phase, wherein said heating step comprises heating the mixture to a temperature slightly above the gelatinization temperature of the cereal starch and said cooling step comprises cooling the mixture as early as after only partial gelatinization of the cereal starch.

2. The process as claimed in claim 1, wherein the mixture is heated to a temperature of about 58° C.

3. The process as claimed in claim 1, wherein the ground cereal and water is mixed at room temperature.

4. The process as claimed in claim 1, further comprising the step of adding lime to the starting mixture in an amount such that the dough has a pH of approximately 9.0 to 11.0.

5. The process as claimed in claim 1, wherein the heating of the mixture is conducted by frictional heat of the mixing equipment.

6. The process as claimed in claim 1, wherein the heating of the mixture is conducted by direct introduction of steam.

7. The process as claimed in claim 1, further comprising the step of providing a holding time after mixing the ground cereals to form a mixture.

8. The process as claimed in claim 7, further comprising the step of providing a second holding time after heating the mixture to the gelatinization temperature.

9. The process as claimed in claim 1, wherein said cooling step comprises cooling the mixture to a temperature less than about 50° C.

10. The process as claimed in claim 1, wherein said cooling step comprises applying a vacuum condenser to the mixture.

11. The process as claimed in claim 1, further comprising the step of mixing the mixture during the cooling step by means of rotating mixing equipment.

12. The process as claimed in claim 11, comprising intermittently mixing the mixture during the cooling step.

13. The process as claimed in claim 1, wherein only part of the recipe amount of water is added to the ground cereals, and the remaining amount of recipe water is added in the cooling step.

14. The process for preparing a corn dough as claimed in claim 1, wherein the ground cereal is a mixture of fine flour and particles of up to 2 mm in diameter.

15. The process as claimed in claim 14, wherein said mixing step comprises mixing the ground cereal by means of mixing equipment rotating at high speeds for a period of time of less than about 1 minute.

16. The process as claimed in claim 7, wherein the first holding time is approximately 5 to 10 minutes.

17. The process as claimed in claim 8, wherein the second holding time is up to 5 about minutes.

18. The process as claimed in claim 17, wherein the second holding time is up to about 5 minutes.

19. The product made according to the process as claimed in claim 1, which comprises a cold, dense, slightly cohesive but not sticky dough which can be easily processed with a machine, has a moisture content of approximately 46% to 52% and a pH of less than about 11.0.

20. A process according to claim 1, wherein said food grade acidic compound comprises a food grade acid.

21. A process according to claim 1, wherein said food grade acidic compound is selected from the group consisting of phosphoric acid, fumaric acid, citric acid, malic acid, ascorbic acid, epichlorohydrin, phosphoroxychloride, acrolein, sodium trimetaphosphate, succinic acid anhydride, adipic acid anhydride, an acetic acid ester and an hydroxypropyl ester.

22. A process according to claim 1, wherein said food grade acidic compound is added as a 75% solution to the starting mixture in an amount of approximately 0.4 weight percent based on the weight of the starting mixture.

23. A process according to claim 1, wherein said acidic compound is added as an initial ingredient, and further comprising the step of adding calcium hydroxide during said heating step.

24. A process according to claim 23, wherein approximately 0.3 weight percent calcium hydroxide based upon the weight of the initial mixture is added.

25. A process according to claim 23, wherein the calcium hydroxide is added when the mixture is at a temperature of of approximately 57° C., and wherein subsequently the mixture is heated to a temperature of approximately 61° C.

26. A process for preparing dough, used in the preparation of snack foods, comprising:
   mixing ground cereals with water to form a mixture wherein calcium hydroxide is added to said mixture of ground cereal and water;
   heating the mixture to a temperature of between about 50° C. and 70° C.;
   adding a food grade acidic compound during said heating step; and
   subsequently cooling the mixture in a cooling phase, wherein said heating step comprises heating the mixture to a temperature slightly above the gelatinization temperature of the cereal starch and said cooling step comprises cooling the mixture as early as after only partial gelatinization of the cereal starch.

27. A process according to claim 26, wherein said food grade acidic compound comprises fumaric acid.

28. A process according to claim 27, wherein fumaric acid is added when the temperature of the mixture is approximately 52° C., and wherein subsequently the mixture is heated to a temperature of approximately 65° C.

29. A process according to claim 1, wherein the amount of acidic compound is selected so that the dough has a pH value within the range of from about 3.5 to about 11.

30. A process according to claim 29, wherein the pH value of the dough is within the range of from about 6 to about 8.

31. A process according to claim 20, wherein said food grade acid comprises phosphoric acid or fumaric acid.

32. The product made according to the process as claimed in claim 1, which comprises a cold, dense, slightly cohesive but not sticky dough which can be easily processed with a machine, has a moisture content within the range of from about 46% to about 52%, and a pH within the range of from about 6 to about 8.

* * * * *